(12) United States Patent
Litwiller

(10) Patent No.: US 7,176,898 B2
(45) Date of Patent: Feb. 13, 2007

(54) REMOVABLE CONTROL PANEL FOR MULTI-FUNCTION EQUIPMENT

(75) Inventor: Debora Margaret Hejza Litwiller, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 359 days.

(21) Appl. No.: 10/243,569

(22) Filed: Sep. 13, 2002

(65) Prior Publication Data

US 2004/0061677 A1    Apr. 1, 2004

(51) Int. Cl.
    *G09G 5/00* (2006.01)
(52) U.S. Cl. .................. 345/173; 345/168; 345/179; 341/21; 399/81
(58) Field of Classification Search ........ 345/168–169, 345/173, 729, 865, 179; 341/21–22, 27; 399/81; D18/14; D14/218; 361/680
    See application file for complete search history.

(56) References Cited

U.S. PATENT DOCUMENTS

| | | | |
|---|---|---|---|
| 5,225,920 A | 7/1993 | Kasazumi et al. | |
| 5,287,102 A | 2/1994 | McKiel, Jr. | |
| 5,412,189 A | 5/1995 | Cragun | |
| 5,479,191 A | 12/1995 | Komatsu | |
| 5,533,182 A | 7/1996 | Bates et al. | |
| 5,543,897 A * | 8/1996 | Altrieth, III | 399/81 |
| 5,556,283 A | 9/1996 | Stendardo et al. | |
| 5,589,855 A | 12/1996 | Blumstein et al. | |
| 5,601,432 A | 2/1997 | Bergman | |
| 5,621,906 A | 4/1997 | O'Neill et al. | |
| 5,714,978 A | 2/1998 | Yamanaka et al. | |
| 5,740,390 A | 4/1998 | Pickover et al. | |
| 5,742,779 A | 4/1998 | Steele et al. | |
| 5,748,177 A | 5/1998 | Baker et al. | |
| 5,825,353 A * | 10/1998 | Will | 345/184 |
| 5,896,129 A | 4/1999 | Murphy et al. | |
| 5,943,043 A | 8/1999 | Furuhata et al. | |
| 5,977,867 A | 11/1999 | Blouin | |
| 6,049,328 A | 4/2000 | Vanderheiden | |
| 6,061,666 A | 5/2000 | Do et al. | |
| 6,068,485 A | 5/2000 | Linebarger et al. | |
| 6,140,913 A | 10/2000 | Okada et al. | |
| 6,219,034 B1 | 4/2001 | Elbing et al. | |
| 6,247,085 B1 * | 6/2001 | Youngers | 710/305 |
| 6,267,598 B1 | 7/2001 | Alien et al. | |

(Continued)

Primary Examiner—Richard Hjerpe
Assistant Examiner—Kimnhung Nguyen (57) ABSTRACT

What is disclosed are various embodiments of a removable control panel for multi-function equipment for the alternative navigation and selection of various available options presented. The embodiment of FIG. 7 is shown comprising four arrow-shaped buttons so the impaired user can navigate controls and options displayed. An ENTER button is provided for formalizing the entry of desired selections, where required. An UNDO button is provided to de-select entries. A STATUS button initiates audio, visual, or tactile feedback as to machine state, status, and other assistance. An ENLARGE button is provided by which a visually impaired user can enlarge their current focus for easier seeing and reading. An ON/OFF switch enables/disables feedback for use in those work environments where such assistance is not desired. Each of the buttons has an identifying shape, which can be differentiated by feel, and Braille and other text are additionally provided. This particular embodiment further advantageously comprises an interface jack for use by those users who make use of communicative devices. The present device is removable from an accessible holding carriage for use by persons working from either a wheelchair or from a prone position.

11 Claims, 12 Drawing Sheets

U.S. PATENT DOCUMENTS

| | | |
|---|---|---|
| 6,278,441 B1 | 8/2001 | Gouzman et al. |
| 6,309,305 B1 | 10/2001 | Kraft |
| 6,362,813 B1 | 3/2002 | Worn et al. |
| 6,384,743 B1 | 5/2002 | Vanderheiden |
| 6,424,338 B1 | 7/2002 | Anderson |
| 6,469,712 B1 | 10/2002 | Hilpert, Jr. et al. |
| 6,474,547 B1 | 11/2002 | Suzuki |
| 6,489,951 B1 | 12/2002 | Wong et al. |
| 6,492,978 B1 * | 12/2002 | Selig et al. ............ 345/173 |
| 6,496,182 B1 | 12/2002 | Wong et al. |
| 6,502,032 B1 | 12/2002 | Newman |
| 6,502,668 B1 * | 1/2003 | Chida et al. ............ 187/395 |
| 6,532,005 B1 | 3/2003 | Campbell |
| 6,559,866 B2 | 5/2003 | Kolde et al. |
| 6,597,374 B1 * | 7/2003 | Baker et al. ............ 715/717 |
| 6,603,461 B2 | 8/2003 | Smith et al. |
| 6,624,803 B1 * | 9/2003 | Vanderheiden et al. ..... 345/156 |
| 6,636,202 B2 | 10/2003 | Ishmael et al. |
| 6,639,577 B2 | 10/2003 | Eberhard |
| 6,665,173 B2 | 12/2003 | Brandenberg et al. |
| 6,690,391 B1 | 2/2004 | Proehl et al. |
| 6,717,528 B1 * | 4/2004 | Burleson et al. ............ 345/169 |
| 6,717,600 B2 | 4/2004 | Dutta et al. |
| 6,965,511 B2 * | 11/2005 | Rudd et al. ............ 361/680 |
| 2001/0020904 A1 | 9/2001 | Dayle |
| 2002/0075317 A1 | 6/2002 | Dardick |
| 2002/0158836 A1 | 10/2002 | Ishmael et al. |
| 2002/0158920 A1 | 10/2002 | Abrams |
| 2002/0163543 A1 | 11/2002 | Oshikiri |
| 2002/0171685 A1 * | 11/2002 | Christianson et al. ....... 345/835 |
| 2003/0043196 A1 | 3/2003 | Gibson |
| 2003/0071859 A1 | 4/2003 | Takami et al. |
| 2003/0086720 A1 * | 5/2003 | Song ............ 399/81 |
| 2003/0098892 A1 | 5/2003 | Hiipakka |
| 2003/0108356 A1 * | 6/2003 | Sugimoto ............ 399/81 |
| 2003/0184524 A1 | 10/2003 | Stohrer et al. |
| 2003/0193481 A1 * | 10/2003 | Sokolsky ............ 345/173 |
| 2003/0201984 A1 * | 10/2003 | Falvo ............ 345/173 |
| 2003/0234763 A1 | 12/2003 | Litwiller |
| 2003/0234824 A1 | 12/2003 | Litwiller |
| 2003/0235426 A1 * | 12/2003 | Odani ............ 399/81 |
| 2004/0051746 A1 | 3/2004 | Litwiller |
| 2005/0035950 A1 * | 2/2005 | Daniels ............ 345/169 |

* cited by examiner

REMOVABLE CONTROL PANEL FOR MULTI-FUNCTION EQUIPMENT

CROSS-REFERENCE TO RELATED APPLICATIONS

Reference is made to commonly-assigned copending U.S. patent application Ser. No. 10/243,570, filed herewith, entitled "EMBEDDED CONTROL PANEL FOR MULTI-FUNCTION EQUIPMENT", by Debora Margaret Hejza Litwiller; U.S. patent application Ser. No. 10/179,555, filed Jun. 24, 2002, entitled "SYSTEM AND METHOD FOR AUDIBLE FEEDBACK FOR TOUCH SCREEN DISPLAYS", by Debora Margaret Hejza Litwiller; and U.S. patent application Ser. No. 10/179,530, filed Jun. 24, 2002, entitled "SYSTEM FOR AUDIBLE FEEDBACK FOR TOUCH SCREEN DISPLAYS", by Debora Margaret Hejza Litwiller, the disclosures of which are incorporated herein.

FIELD OF THE INVENTION

The present invention is generally directed to control panels of multi-function office equipment and, in particular, to control panels which enable impaired users thereof to navigate the controls of said equipment and to navigate and select various options displayed or otherwise presented.

BACKGROUND OF THE INVENTION

Figure 1:
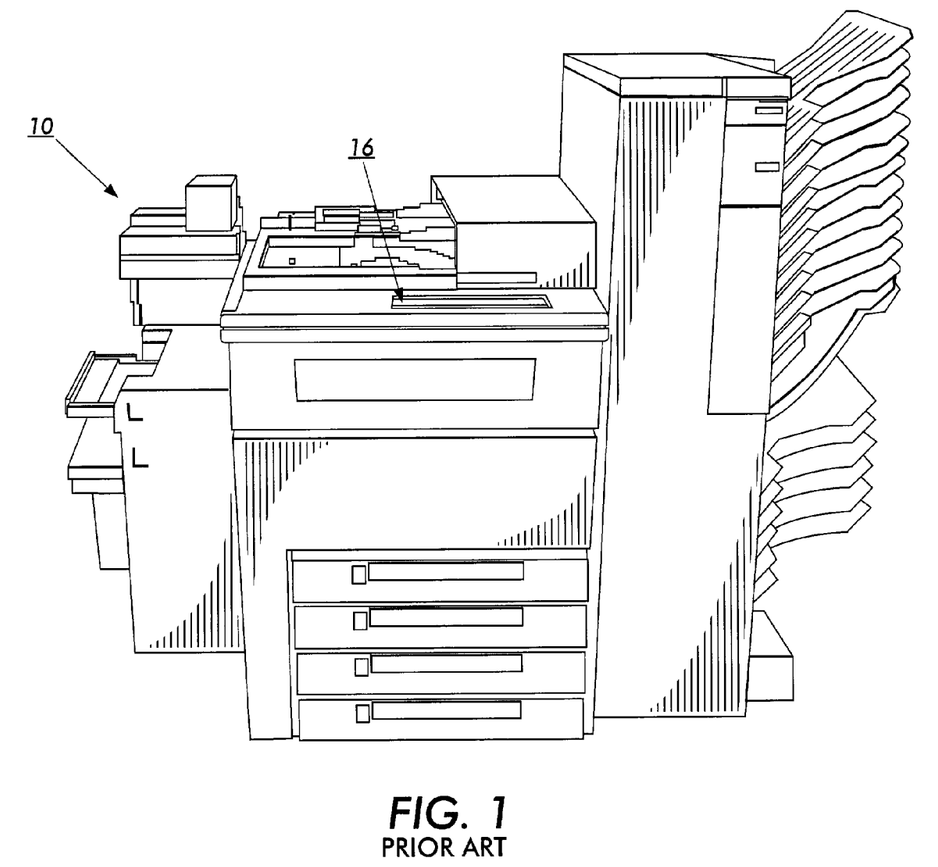
FIG. 1 illustrates multi-function office equipment known in the arts.

Office equipment, as that which is illustrated in FIG. 1 for example, often have control or configuration panels through which the user thereof operates the equipment along with display screens presenting menu options or other various selections in order to configure the equipment prior to use. The selectable menu options displayed are often presented on a display and are navigable and selectable by the control panel itself or by touch screen display with options navigable and selectable by the user physically touching the surface of the display itself to navigate and select option presented thereon. Such displays often have many levels of hierarchically structured menus because, depending on the complexity of the number and type of selectable options there may not be enough real estate or physical room on the display on which to fit all the various options available. A user of such equipment, in order to select all their desired options to setup or otherwise configure a complex machine to their particular job requirements, will most likely be required to navigate through the plurality of options available by using local controls/keypad or by repeatedly touching the screen display itself.

For instance, assume that a user of a piece of multi-function equipment as illustrated in FIG. 1 desires to have copies made using certain paper other than that is currently available in the default paper tray. Such a user would navigate over the various options available until they reached options for selecting a secondary tray of paper. This may or may not involve navigating through a hierarchy of options in order to reach the various paper tray selections. Once the user has navigated to the desired options they would enter or otherwise formalize their selection by pressing ENTER on the control panel or keypad or by physically touching that selectable option on the display screen itself. After the desired paper tray has been selected the machine will initiate a mechanical switching of the paper trays such that the desired paper type becomes ready for use. After other options have been entered the user will typically select START or PRINT/COPY to begin copying.

Individuals that are impaired may encounter difficulty setting up, configuring or operating such multi-function equipment. If, for example, the user is visually impaired they may not clearly see the options displayed or other helpful information. If the user is completely visually impaired they may not be able to use such multi-function equipment without the assistance of others. If the user has limited motor skills or has difficulty with fine motor control their use of such equipment may be precluded because they may not be able to manipulate the controls or keypad buttons to navigate and select options presented or, if the machine has a touch screen display which requires an accurate physical touching on the surface of the display itself, such impaired users not be able to use such machines without assistance. This problem is highlighted in the case of those users whose physical impairment is so severe that they require the use of a mouth-stick, or puff-stick, or eye-pointer, or some other specialized augmentative communication device to communicate with the world around them. Buttons or keys on control panels are often too small or are not accessible. Touch screen displays are again particularly troublesome because these displays require an accurate physical touching of the display surface. Such displays may not be handicap accessible or the touchable areas comprising the display may be too small. Further, because touch screen displays are intended to be sensitive to the touch, if such an impaired user drags their finger or augmentative pointing device across the display surface they may inadvertently touch (select) unintended options. These kinds of difficulties also highlight the need in the arts for alternate means to make such multifunction equipment more readily accessible to impaired persons.

What is needed in the arts is means for alternative control and navigation and selection of options displayed or otherwise made available on multi-function equipment which provides assistance to visually, physically, or cognitively impaired persons in the configuration, operation, and use of such machines.

SUMMARY OF THE INVENTION

Figure 7:
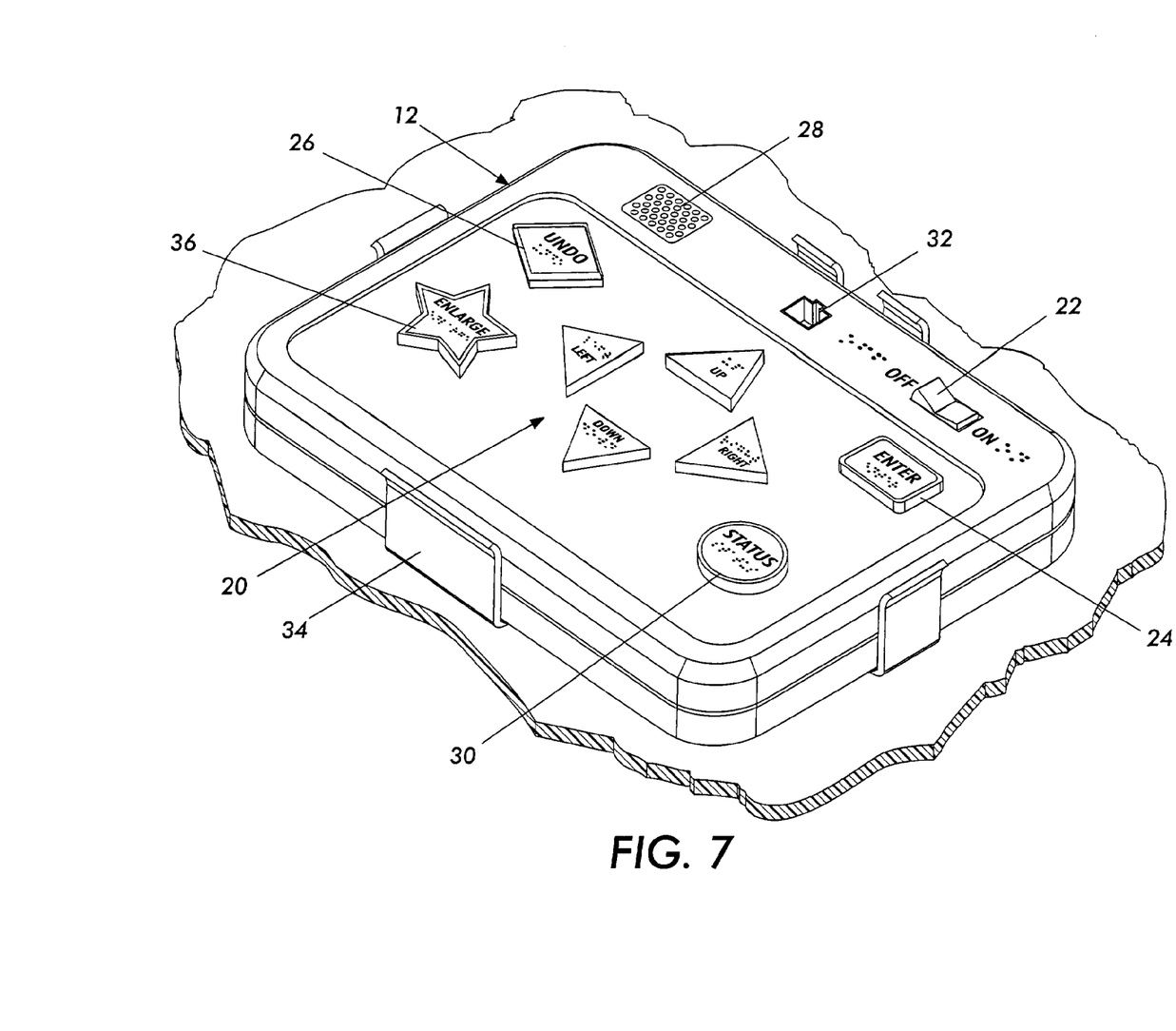
FIG. 7 illustrates the embodiment of FIG. 6 alternatively configured and further comprising a uniquely shaped (e.g., star) ENLARGE button at 36 for incrementally enlarging text and other displayed information (as shown in FIG. 10) for the assistance of the visually impaired.

What is disclosed are various embodiments of a removable control panel for multi-function equipment for the alternative navigation and selection of various available options presented. The embodiment of FIG. 7 is shown comprising four arrow-shaped buttons so the impaired user can navigate controls and options displayed. An ENTER button is provided for formalizing the entry of desired selections, where required. An UNDO button is provided to de-select entries. A STATUS button initiates audio, visual, or tactile feedback as to machine state, status, and other assistance. An ENLARGE button is provided by which a visually impaired user can enlarge their current focus for easier seeing and reading. An ON/OFF switch enables/disables feedback for use in those work environments where such assistance is not desired. Each of the buttons have an identifying shape which can be differentiated by feel and Braille and other text are additionally provided. This particular embodiment further advantageously comprises an interface jack for use by those users who make use of communicative devices. The present device is removable from an accessible holding carriage for use by persons working from either a wheelchair or from a prone position.

DETAILED DESCRIPTION OF THE INVENTION

What is disclosed are various embodiments of a removable control panel for multi-function equipment for the alternative and selection of various available options presented.

It should be understood that depending on the type and complexity of the office machine or other such multi-function equipment to which the present invention finds its intended uses, inter-activity between software and hardware mechanisms would necessarily differ as a matter of design as would the type options available thereon. As such, the disclosure herein is necessarily limited to detailing how the features of the present invention perform and what they are intended to do in terms of solving the problem in the arts previously discussed. The user's selection of controls or options presented in turn initiate machine responses and/or present to the user the next option state whether it be other selectable features or the presentation of additional levels of more selectable options. Those skilled in the art of computer programming and the arts of system design, development, and integration would be able to make and use the present invention on hardware such persons already have technical familiarity and competence.

As used herein, the term 'option' means those controls or selectable areas to which the user can navigate and operate or select (skipping dead space, etc.).

Attention is briefly directed to FIG. 1 which is an illustration of a piece of multifunction equipment for the office environment commonly found in the arts to which the embodiments detailed herein are directed for exemplary purposes.

Figure 2:
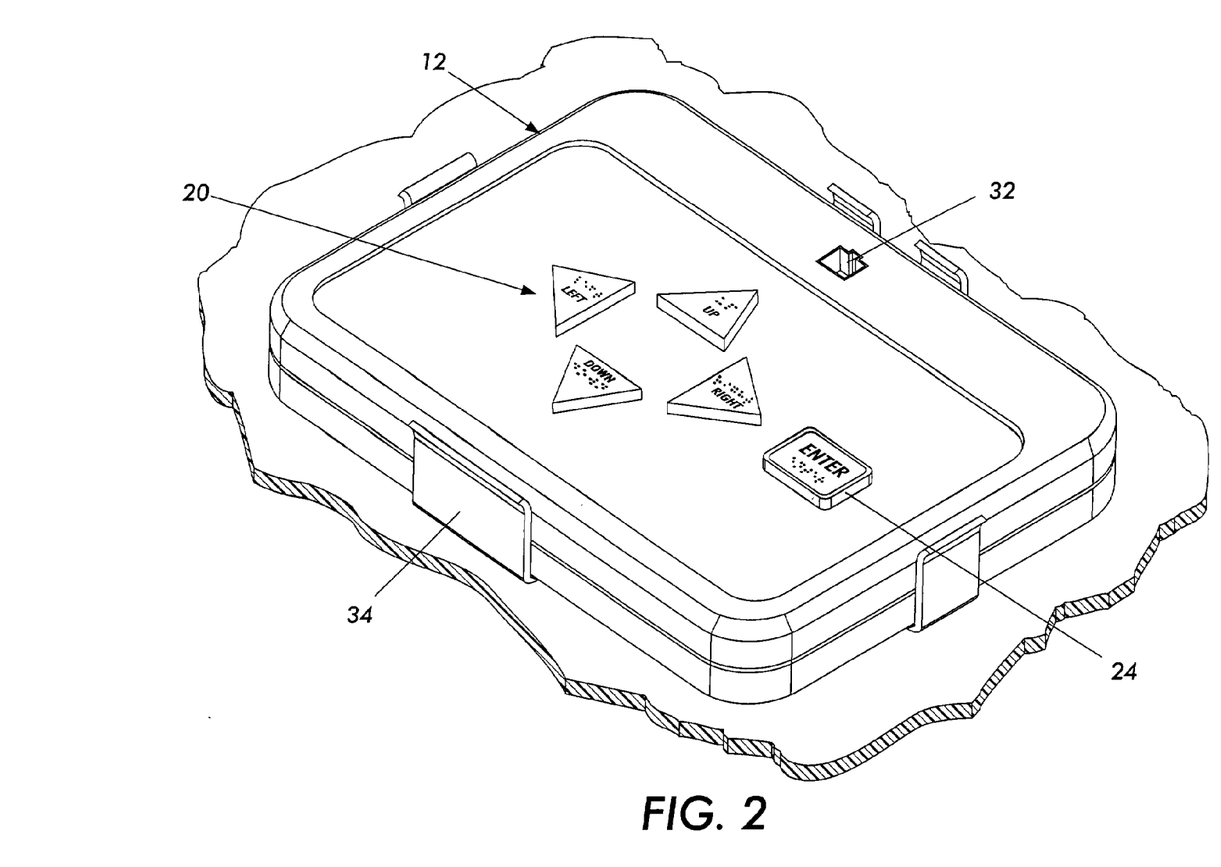
FIG. 2 illustrates one embodiment shown secured by carriage 34 (more fully illustrated in FIG. 8) and comprising 4 uniquely shaped (e.g., arrow) buttons for navigation of controls and other selectable areas, a uniquely shaped (e.g., rectangular) ENTER button 24 for formally selecting options, and an interface 32 for connection to electronic or other augmentative devices used by severely impaired persons.
Figure 8:
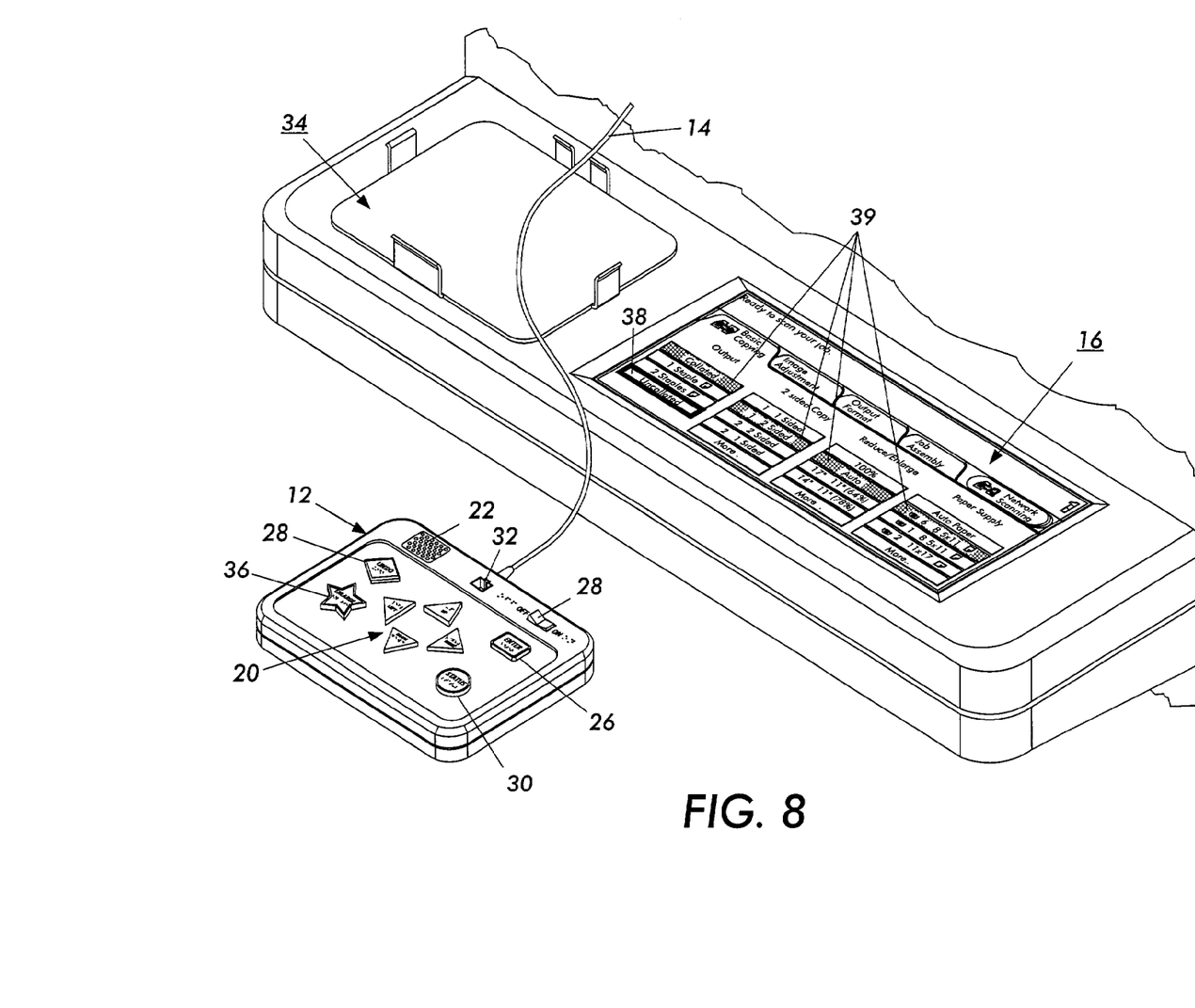
FIG. 8 illustrates a control panel of a multi-function device wherein the embodiment of FIG. 7 is removed from its holding carriage 34 (thus providing a better view thereof) for use by those persons who operate from a wheelchair or a prone position.

Attention is now directed to FIG. 2 which is a close-up view of one embodiment of the removable control panel 12 of the present invention shown secured by a plurality of clasps or tangs generally comprising carriage 34 (more fully illustrated in FIG. 8). This embodiment comprises navigation means shown collectively at 20 as a plurality of uniquely shaped (e.g., arrow) navigation buttons constructed so as to have an identifying shape indicating the direction of navigation facilitated thereby and are preferably encoded with Braille and text for further assistance. By use of these directional navigation buttons, the user works their way up/down and left/right through the various selectable areas. In the instance wherein the multi-function machine utilizes a screen display for the presentation of options thereon the multi-function equipment itself provides current visual indications through means of either a well defined focus on the screen such as highlighting the current focus or through one or more elements on the interactive interface itself such as illuminating the current control button such that the impaired user thereof has a clear focus as to where they currently are at any point during the navigation process. Note that the various buttons on the embodiments herein are shaped differently so an impaired user thereof can differentiate buttons by feel. Features which further differentiate such as illuminating the current button, knob, slider, dial, or by visual graphics or animations, tactile messaging, or audio features are also envisioned.

Once the user has navigated to a desired control or to a selectable area, in order to formalize that selection or activate that control, the embodiment of FIG. 2 further comprises means for entering comprising a uniquely shaped (e.g., rectangular) ENTER button 24 having a rectangular shape with Braille and other text provided. On multifunction equipment with touch screen displays wherein a selection is formalized or entered by actually physically contacting that option on the display itself, the user of the present removable control panel would formalize their selection by pressing button 24.

This embodiment further comprises interface means 32 shown as a universal-type jack to allow severely handicapped persons to interface therewith electronic or other augmentative communication devices designed for their use and assistance. In such a manner, a user would utilize the present invention therethrough. Although the interface means is illustrated as a RJ-45 jack, it should be understood that one or more other types of connections could alternatively be employed such as USB, IEEE, or other interface connection depending on the type and complexity of the equipment to which the more severely handicapped person is intended to make use of.

Figure 3:
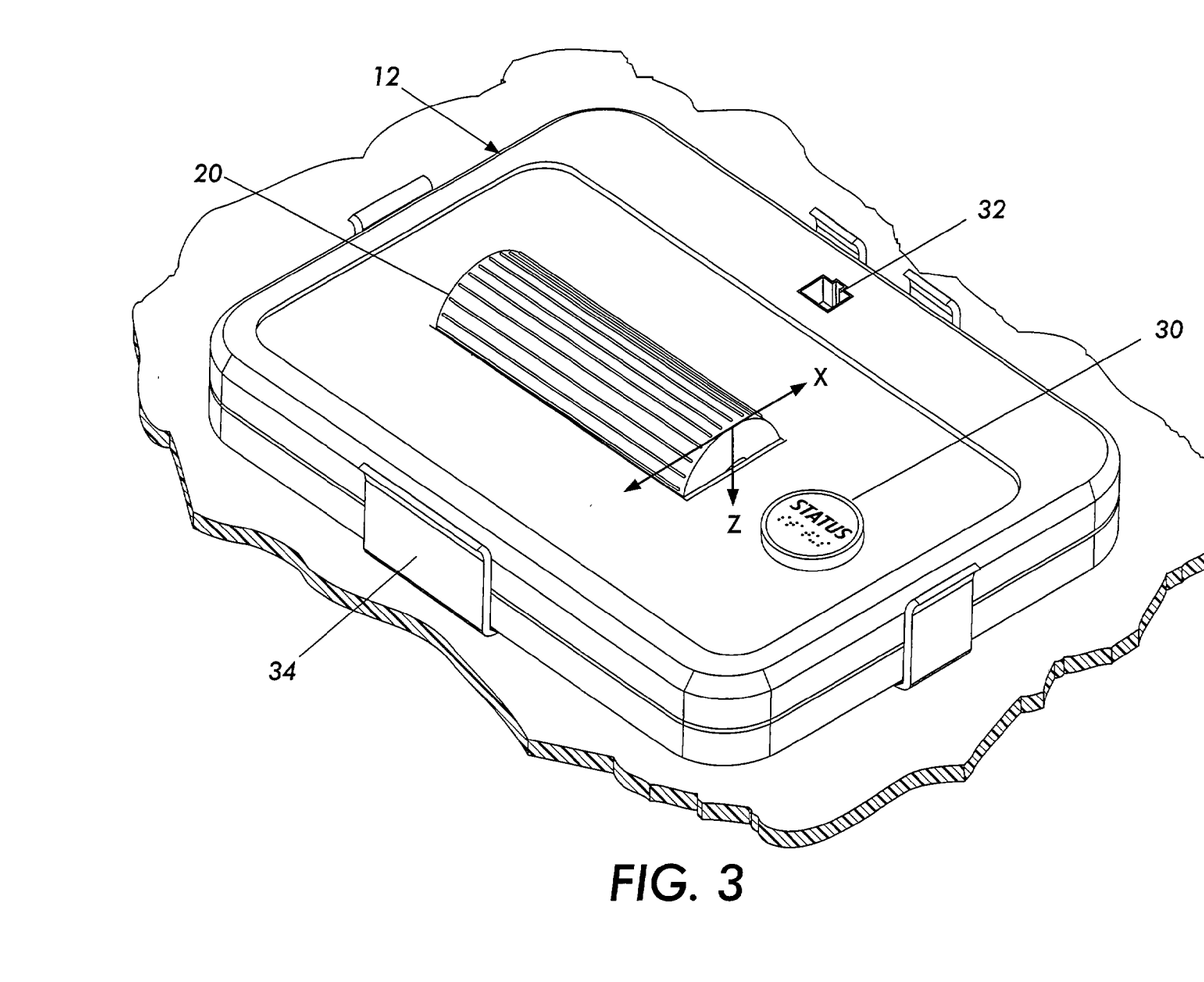
FIG. 3 illustrates the embodiment of FIG. 2 alternatively comprising a scroll-wheel for navigation which is also pushable (in the z-direction) to act as an ENTRY button and further comprising a uniquely shaped (e.g., round) STATUS button at 30.

Attention is now directed to FIG. 3 which illustrates the embodiment of FIG. 2 shown with the navigation means alternatively comprising at least one ribbed scroll-wheel (scrollable in either x-direction) and being pushable (in the z-direction) as means for entering. The wheel is ribbed to facilitate contact with the surface during the movement thereof for assistance to those severely handicapped persons who, for example, utilize a mouth-stick to interact with their surroundings. In this embodiment, the scroll-wheel is horizontally positioned for scrolling forward and back but could alternatively be vertically positioned for scrolling left and right. This embodiment also comprises at least one STATUS button 30 for obtaining informational feedback; and interface means 32 to provide additional flexibility to severely handicapped persons who need to interface with and control the present control panel using augmentative communication devices designed for their assistance.

In terms of how buttons 20 of FIG. 2 or the ribbed scroll-wheel of FIG. 3 move the user's present focus around the display, consider the following with regards to a touch screen display. Assume that a screen display comprises a 10×10 matrix [1 . . . 10, 1 . . . 10] of touchable elements. In the case of the scroll-wheel, assume that it has been configured for continuous up/down (2-dimensional) navigation as the wheel is rotated back and forth along the x-axis (as shown in FIG. 3). Depending on the matrix location of the intended starting selectable option, the user's current position in the matrix of touchable elements would move them from their present column until they reached the top or bottom element of their current column, at which point they would start at the following element of the next column and move from there. For instance, assume that the starting selectable option by default corresponds to matrix element (4,1) in row/column format such that the default selectable option is row 4 column 1 of the matrix of the touch screen display. As the ribbed scroll-wheel of FIG. 3 is rotated by the user's mouth-stick in the x-direction, the user's location in the matrix of touchable elements would move upward to element (3,1) then to (2,1) then to (1,1) in the same column. More wheel movement in this same direction would shift their next current focus to matrix cell (10,2) which is the bottom element of column 2. They would move up from there until they reached (1,2) which is the top element of column 2 and then to (10,3) the bottom element of column 3. In such a manner, by a continuous rotation of the scroll-wheel in the x-direction, the severely handicapped user with a mouth-stick would progress through the entire array of selectable options on the display eventually stopping at a desired option. A movement of the scroll wheel in the opposite direction (opposite the x-direction of FIG. 3) would cause their movement through the matrix of cells to occur in the reverse.

Now, assume that the touch screen display was programmed so that movement of the scroll-wheel in the x-direction (of FIG. 3) progressed the user continuously left/right through the matrix of individual cells of the screen display. Such movement would increment them across successive columns of the same row then down to the first column of the next row after they have reached the end of a row. By way of example, assume that the default selectable option corresponds to matrix element (4,1) as in the previous example. An incremental movement of the scroll-wheel in the x-direction would progress the user's current focus across the matrix of cells over to element (4,2) which is the second column in row 4. In other words, their position in the matrix remains in the same row but their movement is one column to the right. Subsequent movements of the wheel in this same x-direction would bump them next to cell (4,3) then to (4,4) then to (4,5), etc. until they were at (4,10) which is the last column in row 4. Another movement of the scroll-wheel in this same x-direction would bump their position in the matrix of touchable elements to another row down to cell (5,1) which is the fifth row first cell. In such a manner, the user by continuously moving the scroll-wheel in a single direction has repositioned their current focus from the default selectable option, across the entire row, and are now at the first column of another row. A movement of the scroll-wheel in the opposite direction would move their current focus or location in the matrix of touchable elements in the reverse direction. In such a manner, by a continuous rotation of the scroll-wheel in the x-direction, the severely handicapped user by use of their mouth-stick to rotate the scroll-wheel incrementally progresses through the various selectable options on the display eventually stopping at their desired option. As previously indicated, once the user has navigated to a particular selectable option on the display which they desire to select then the user would press down on the scroll-wheel itself (in the direction along the z-axis of FIG. 3) to make the selection. The embodiment with the scroll-wheel provides even a severely impaired user who interacts with their world through a mouth-stick convenient means for navigation to and then selecting selectable options on screen display. One skilled in the art of programming displays of selectable options would readily be able implement the above described 4-way movements of the arrow-shaped buttons or the 2-way movement of the scroll-wheel of FIG. 3 so as to have the user progress incrementally up/down or left/right through the various selectable options and then be able to select an entry.

Figure 4:
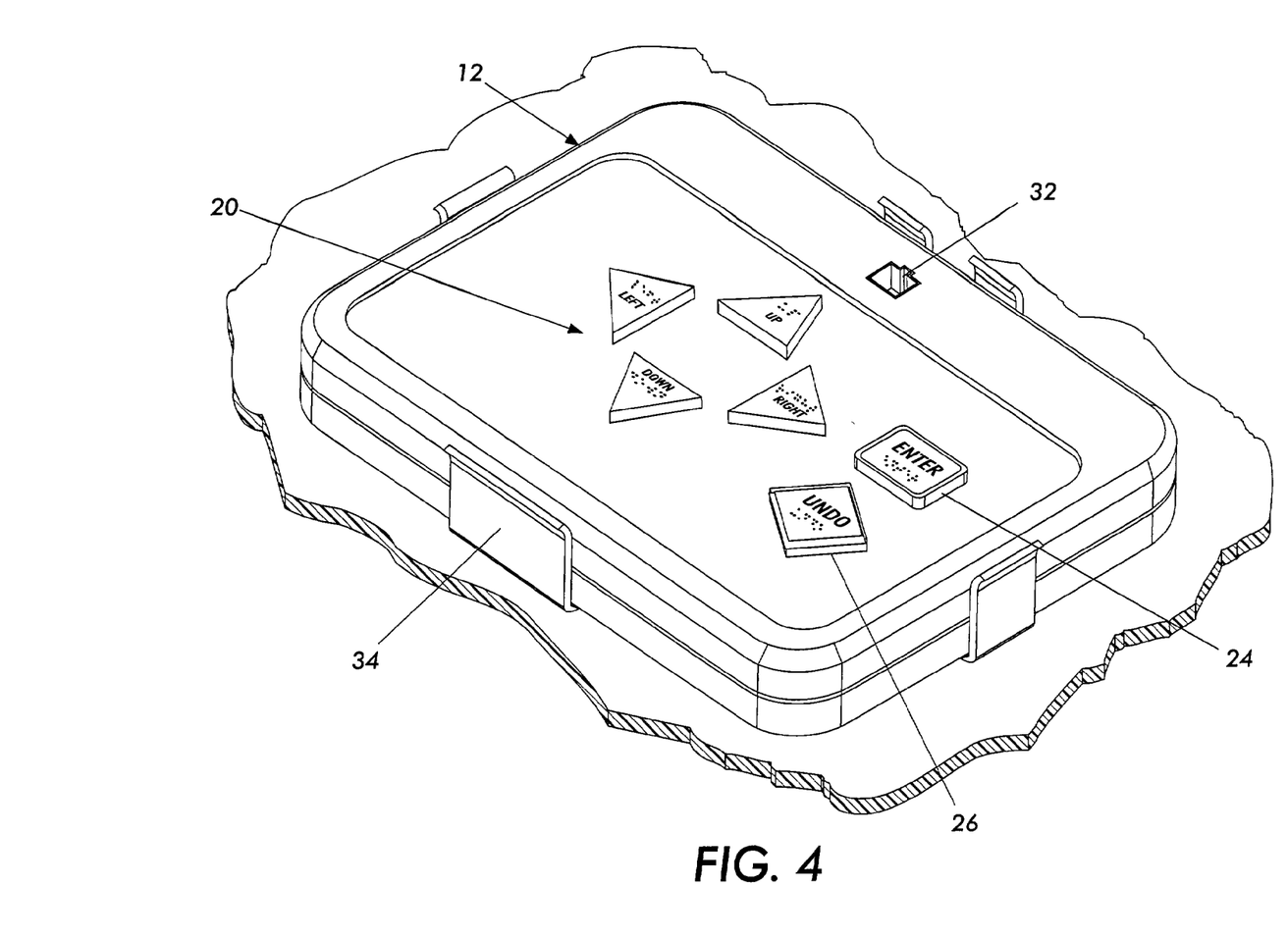
FIG. 4 illustrates the embodiment of FIG. 2 further comprising a uniquely shaped (e.g., diamond) UNDO button at 26 for undoing previous entries.

Attention is now directed to FIG. 4 illustrating the embodiment of FIG. 2 further comprising at least one uniquely shaped (e.g., diamond) UNDO button 26 to provide a convenient mechanism by which the user could undo a previous entry. This is preferable in the instance wherein the user has made a selection which they no longer desire or for some other reason they wish to retract or otherwise undo. One skilled in the arts would configure their means for undoing according to their requirements. Preferably, feedback is provided to reflect changes.

Figure 5:
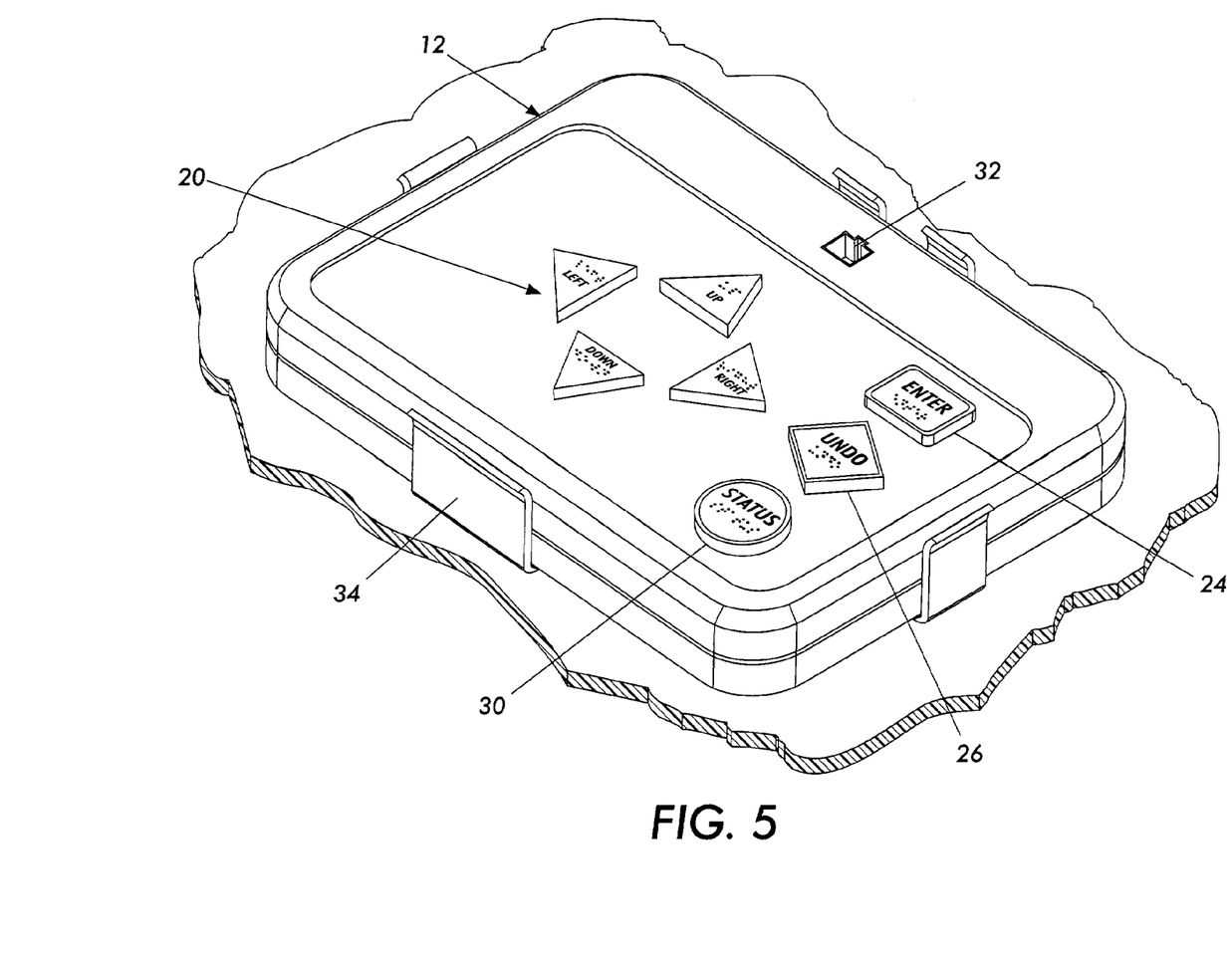
FIG. 5 illustrates the embodiment of FIG. 2 further comprising a uniquely shaped (e.g., round) STATUS button at 30.

Attention is now directed to FIG. 5 illustrating the embodiment of FIG. 2 further comprising at least one uniquely shaped (e.g., round) STATUS button 30 for obtaining informational feedback. This button is configured with a rounded shape to enable an impaired user to differentiate the buttons by feel and has Braille and textual information associated therewith. The STATUS button is preferably configured to provided as much feedback (preferably audio) information as possible to further assist the impaired user. For instance, if nothing is happening or the user believes that something has gone wrong they could press the STATUS button. The machine would then provide the user with an array of audio and/or visual feedback. Exemplary feedback includes: providing the user with further information as to where they are in the hierarchy of selectable options (e.g., "PAPER SELECTION MENU", "NUMBER OF COPIES MENU", "HELP MENU", etc.); what their job status is and what is expected of them next (e.g., "TRAY TWO IS OUT OF PAPER", "THIS SELECTION IS NOT AVAILABLE", "MACHINE SERVICE IS REQUESTED", "READY TO BEGIN JOB", etc.); the state of the machine (e.g., "WARMING UP—PLEASE WAIT", "PRESENTLY OFFLINE", etc.). Alternatively after pressing STATUS the user would get feedback as to all their present options, for example: "READY TO SCAN YOUR JOB, QUANTITY ONE SELECTED, COLLATED OUTPUT SELECTED, ONE-TO-ONE SIDED SELECTED, 100% ENLARGE SELECTED, AND 8×11 TRAY 6 PAPER SUPPLY SELECTED." It should be understood that the nature and type of messages provided would depend on what the designers of their specific equipment or machinery feel is adequate and important for assistance purposes. Also, a plurality of STATUS buttons individually providing further differentiation as to different types of feedback such as: STATE, STATUS, HELP, etc. are anticipated.

Figure 6:
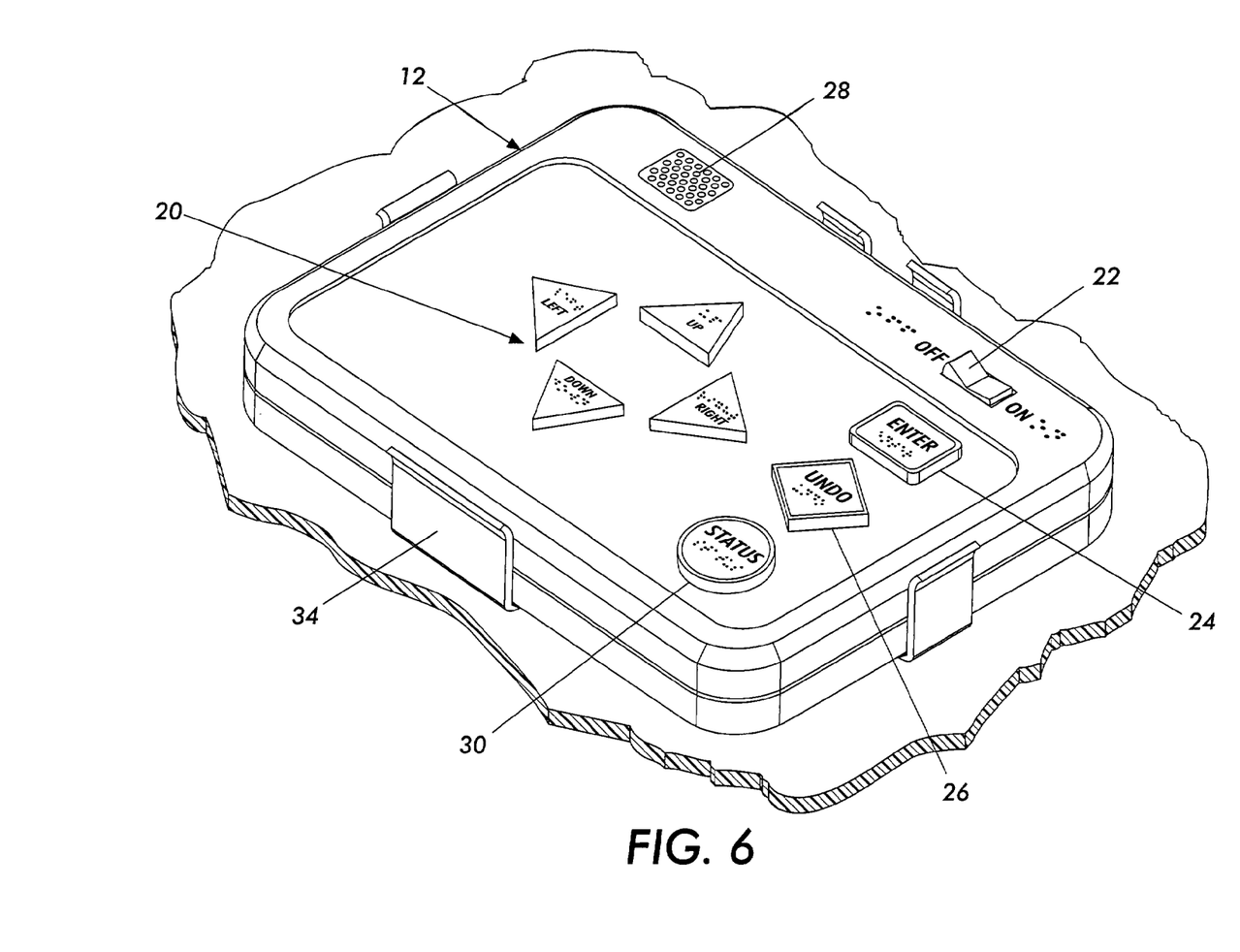
FIG. 6 illustrates the combination of the embodiments of FIGS. 4 and 5 and further comprising a recessed speaker 28 for audio feedback therethrough and an ON/OFF switch at 22 for enabling/disabling the audio feedback.

Attention is now directed to FIG. 6 illustrating the combination of the features of the embodiments of FIGS. 4 and 5 and further comprising a recessed speaker covered by grill 28 as the at least one feedback means provided and having at least one ON/OFF switch 22 for enabling/disabling said feedback means. This capability is advantageous and preferable when such feedback is either not needed or in those environments where audio feedback is desired to be turned OFF (e.g., environments requiring some degree of relative quietness). Audio feedback was previously described in the discussion of the embodiment of FIG. 5 with the distinction being that the feedback means of FIG. 6 is local to the removable control panel as opposed to being provided elsewhere. Also as previously discussed, if feedback in the form of visual and/or tactile were also provided then preferably each of these feedback means would have their own respective ON/OFF switch. It should be understood that the present means for enabling/disabling the feedback means is not to be limited to enabling/disabling only those feedback means. Rather, alternative embodiments could additionally comprise one or more such switches to enable/disable various feedback means local to the removable control panel or on the equipment itself (or any combination thereof). This is preferred in those embodiments which include means for enabling/disabling certain or all of such available feedback means for whatever the underlying design/implementation reason(s). Furthermore, it should be understood that such means for enabling/disabling could also comprise switches other than a simple ON/OFF depending on the complexity of implementation.

Figure 9:
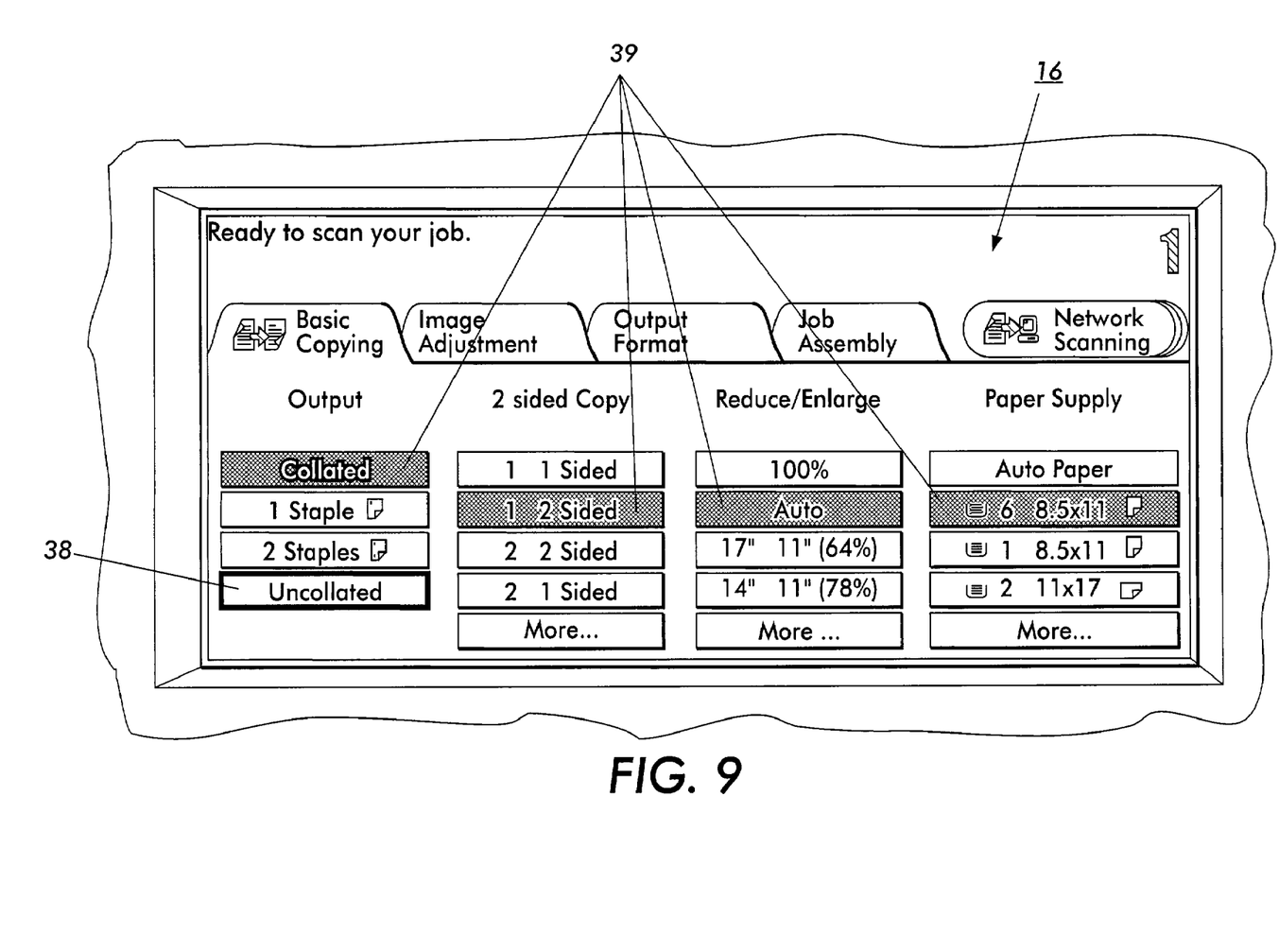
FIG. 9 is an enlarged view of the display of FIG. 8 showing the selected or default options highlighted collectively at 39 and further illustrating the user's current focus at 38.
Figure 10:
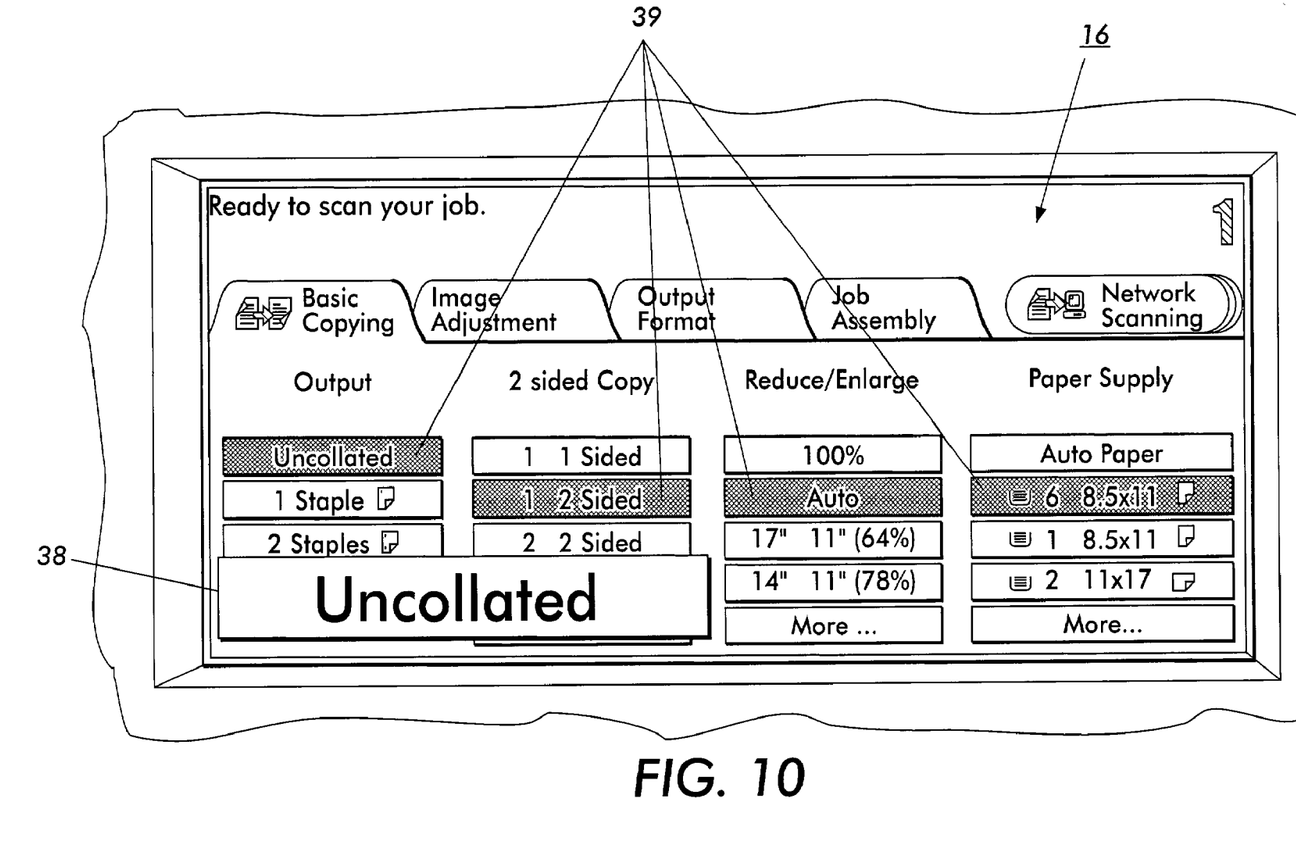
FIG. 10 illustrates the view of FIG. 9 wherein the user's current focus 38 has been enlarged.

Attention is now directed to FIG. 7 illustrating an alternative configuration of the embodiment of FIG. 6 and further comprising at least one uniquely shaped (e.g., star) ENLARGE button 36 for magnifying or otherwise enlarging the current focus (as shown in FIG. 10) in order to assist those users who are visually impaired. Normally, as the user navigates the various options the current focus would be highlighted or bolded as illustrated at 38 in FIG. 9. In addition, the current focus could be enlarged as illustrated at 38 of FIG. 10. This would be achieved by the action of the user's hand pressing 36 as in FIG. 11. Preferably, several levels of increasing powers of enlargement are provided. For example, a three-stage enlargement would operate as follows. A first press of the ENLARGE button would magnify the current selectable option by, for example, 2× which is twice the normal size. A second press of the ENLARGE button would then increase the enlargement to, for example, 5× which is five times the normal size. A third press of the ENLARGE button would then increase enlargement to, for example, 10× normal size. A fourth press of the ENLARGE button would then reset the enlargement scaling back to 1× (i.e., normal size). Depending on the design criteria given the complexity of the office equipment or machinery to which this embodiment finds its intended uses and the nature of the disabilities of the anticipated users thereof, further enlargement scales and in differing increments would preferably be utilized and are intended to be considered within the scope of the present invention.

Attention is now directed to FIG. 8 wherein the embodiment of FIG. 7 is shown removed from carriage 34 (thus providing a better view thereof). The is for the convenient use by those who work from a wheelchair or from a bed. The removable control panel is held by a plurality of tangs and is preferably positioned in a readily accessible location. It should be understood that alternative securing means such as Velcro, snaps, or other means for securing are envisioned.

Attention is now directed to FIG. 9 which, as previously discussed, is an enlarged view of the display of FIG. 8 showing the selected or default options highlighted collectively at 39 and further illustrating the user's current focus at 38. Preferably, the default options are highlighted and as the user makes new or additional selections, those options as well will be bolded or highlighted. This is for their visual convenience. Also, the current focus at 38 is shown as being surrounded by a think bold line. This is to differentiate the user's current focus from options already chosen or defaulted such as those shown collectively at 39. Other types of highlighting, bolding, coloring, etc. which serve to otherwise distinguish the user's current focus from the one or more already selected or defaulted options are anticipated.

FIG. 10 illustrates the view of FIG. 9 wherein the user's current focus 38 has been enlarged.

Figure 11:
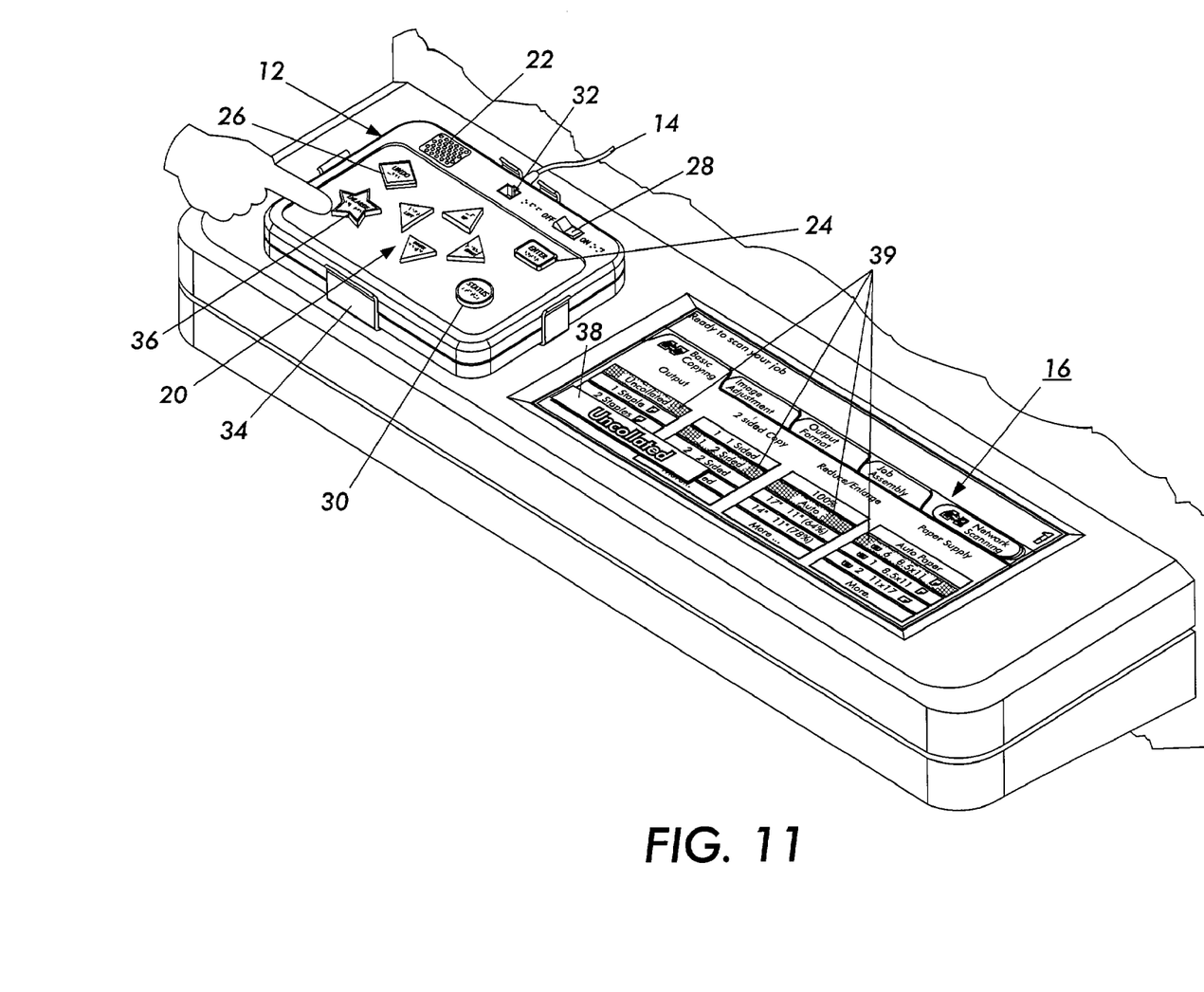
FIG. 11 illustrates the panel of FIG. 8 wherein the removable control panel of the present invention is shown having been secured thereto and illustrating a hand pressing ENLARGE button 36 to effectuate the enlargement of the user's current focus as shown in FIG. 10.

FIG. 11 illustrates the panel of FIG. 8 wherein the removable control panel of the present invention is shown having been secured thereto and illustrating a hand pressing ENLARGE button 36 to effectuate the enlargement of the user's current focus as shown in FIG. 10.

Figure 12:
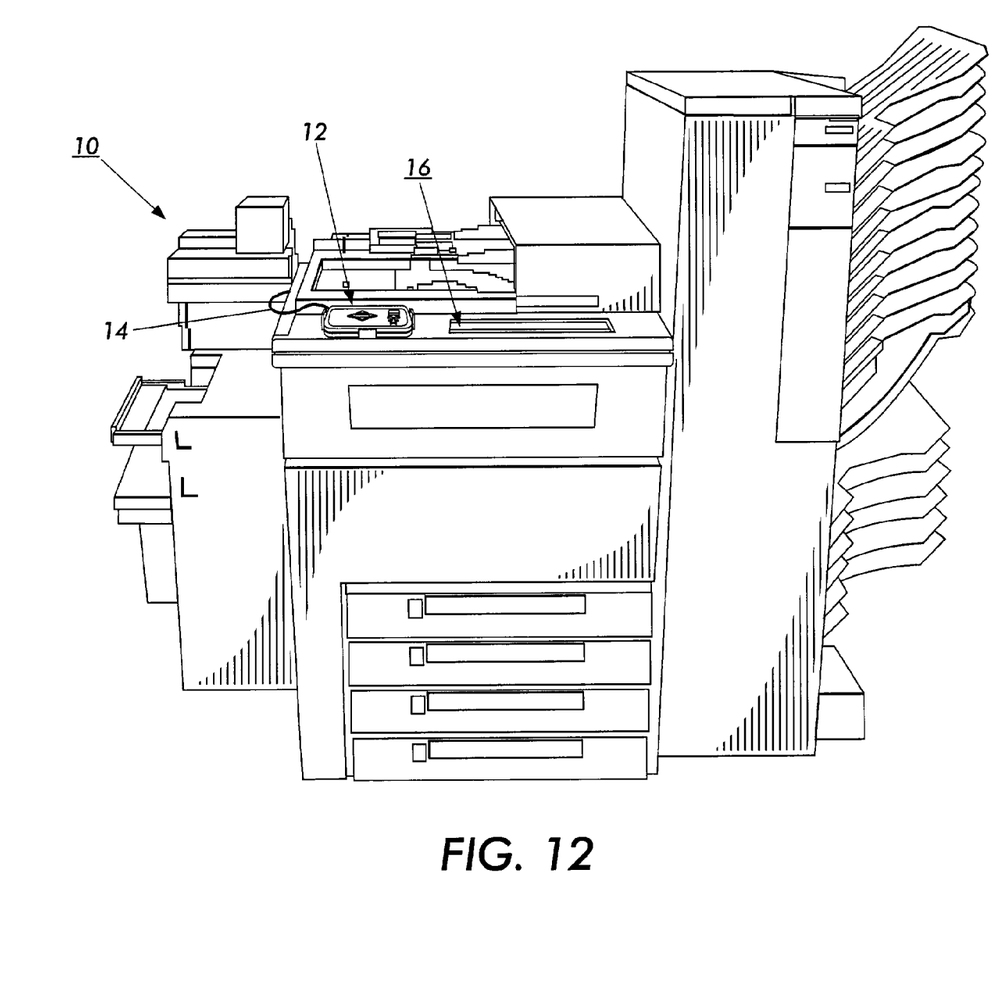
FIG. 12 illustrates the multi-function machine of FIG. 1 into which the panel of FIG. 11 has been designed.

Attention is now directed to FIG. 12 which illustrates the configuration panel of FIG. 11 as applied to the multi-function office machine of FIG. 1. The present invention preferably communicates with its intended equipment through cable 14. The type of cable will depend on the design constraints of the equipment to which the present invention finds its intended uses. Preferably, the cable would be flexible and sturdy to withstand a fair degree of heavy tugging and twisting. In those instances wherein the dangling of the control panel over the side of the equipment poses a hazard or is otherwise not desirable, a cord retraction mechanism could additionally be utilized to automatically retract or reel-in the cable. The present cable also acts as an anti-theft or anti-misplaced means. Alternatively, the removable control panel is placed in wireless communication with the equipment itself and thus transportable. It is also envisioned that the removable control panel NOT be in wireless communication with the office equipment itself but still be non-tethered by a cable or wire. This entails a design of the removable control panel made to plug into or mate with the equipment. In this embodiment, the impaired user could then plug their own control panel into, for example, a socket on the equipment at a handicap accessible location, although such receptacle does not have to be physically located on the office equipment itself so long as it is in communication therewith. In such an instance, each individual user could possess their own version of the present control panel which would be plugged into a readily accessible port for the purposes described in accordance with the teachings herein. Impaired persons could also have a specialized embodiment of the present control panel built into their own hardware. For example, one user may have the present control panel built into the armrest of a wheelchair with a common interface readily available which is then plugged into a specialized port on the equipment itself (or alternatively be in wireless communication therewith) such that this person could thereafter conveniently operate that hardware. Preferably, such personalize embodiments would utilize industry standards to enable the interfacing therewith of a plurality of varying equipment or other office machines. In such a manner, impaired persons would be able to gain access to a wider variety of office equipment and operate other machinery than is presently allowed. This would have the advantage of giving more access to those impaired individuals in society who would benefit by the wider variety of multi-function office equipment commonly available in various lines of work for use along with access to other machinery.

The present invention can be produced by an injection molding process or otherwise manufactured from a lightweight yet durable plastic. The buttons thereon are preferably flexible which facilitates touch sensitivity; although other composites such as plastics, ceramics, metal, etc. are anticipated. The buttons and the surfaces thereof could additionally be colored to provide yet another layer of distinction or differentiation to further assist the user. Furthermore, the present control panel and/or its buttons could alternative comprise a fluorescent or other materials such that they glow in the dark.

In summary, what has been disclosed are various embodiments of a removable control panel for multi-function equipment for the alternative remote use of the controls thereon and for the navigation and selection of various available options displayed or otherwise presented. Hopefully in this art a point in time will arise when a convergence occurs as to standard design layout and configurations such that impaired persons will be able to learn one configuration and thereby make use of a wide variety of equipment so enabled.

What is claimed is:

1. A multi-function office device having selectable options, comprising:
    a housing having a receiving area, said receiving area being located a handicap accessible location on the multi-function office device;
    a touch screen display device located on said housing; said touch screen display device having a plurality of activatable areas to enable selection of options displayed upon said touch screen display device by touch activation of said activatable areas of said touch screen display device; and
    a control panel being removably located at said receiving area;
    said receiving area physically securing said control panel at a handicap accessible location on the multi-function office device;
    said touch screen display device, when said control panel is removed from said receiving area, being located on said housing;
    said control panel being operational when removes from said receiving area;
    said control panel having an activatable input navigational area, said activatable input navigational area of said control panel, upon touch activation thereof, causing said touch screen display device providing to provide a sensory perceivable an indication of an option on said touch screen display device that is selectable by said control panel communicating with the multi-function office device.

2. The multi-function office device as defined in claim 1, wherein said activatable input navigational area of said control panel is a scroll-wheel to provide navigation, upon rotation thereof, between the options on said touch screen display device.

3. The multi-function office device as defined in claim 2, wherein said scroll-wheel provides selection of the indicated selectable option through a depressive activation thereof.

4. The multi-function office device as defined in claim 1, wherein said activatable input navigational area of said control panel is a plurality of individually selectable buttons, each individually selectable button providing incremental directional navigation between the options on said touch screen display device.

5. The multi-function office device as defined in claim 4, wherein each individually selectable button is visually and tactilely differentiateable.

6. The multi-function office device as defined in claim 1, wherein said control panel includes a touch activated button to provide, through activation thereof, selection of the indicated selectable option.

7. The multi-function office device as defined in claim 1, wherein said control panel includes a touch activated button to provide an undoing of a previous entry.

8. The multi-function office device as defined in claim 1, wherein said control panel includes a touch activated button to provide magnifying of information being displayed on said touch screen display device.

9. The multi-function office device as defined in claim 1, wherein said activatable input navigational area of said control panel, upon touch activation thereof, causing said touch screen display device to provide an audio indication of an option on said touch screen display device that is selectable upon touch activation of said selection area of said control panel.

10. The multi-function office device as defined in claim 1, wherein said activatable input navigational area of said control panel, upon touch activation thereof, causing said touch screen display device to provide a visual indication of an option on said touch screen display device that is selectable upon touch activation of said selection area of said control panel.

11. The multi-function office device as defined in claim 1, wherein said activatable input navigational area of said control panel, upon touch activation thereof, causing said touch screen display device to provide a tactile indication of an option on said touch screen display device that is selectable upon touch activation of said selection area of said control panel.

* * * * *